United States Patent
Messina et al.

(10) Patent No.: US 11,698,461 B1
(45) Date of Patent: Jul. 11, 2023

(54) GPS DENIAL DETECTION AND REPORTING AND MITIGATION

(71) Applicant: Telephonics Corporation, Farmingdale, NY (US)

(72) Inventors: Frank D. Messina, Huntington, NY (US); Michael Stein, Patchogue, NY (US)

(73) Assignee: Telephonics Corp., Farmingdale, NY (US)

(*) Notice: Subject to any disclaimer, the term of this patent is extended or adjusted under 35 U.S.C. 154(b) by 174 days.

(21) Appl. No.: 17/121,853

(22) Filed: Dec. 15, 2020

Related U.S. Application Data

(63) Continuation-in-part of application No. 17/088,768, filed on Nov. 4, 2020.
(Continued)

(51) Int. Cl.
*G01S 19/01* (2010.01)
*G08G 5/00* (2006.01)
(Continued)

(52) U.S. Cl.
CPC .......... *G01S 19/015* (2013.01); *G01S 19/258* (2013.01); *G08G 5/0013* (2013.01); *H04W 72/23* (2023.01)

(58) Field of Classification Search
CPC .... G01S 19/015; G01S 19/258; G01S 19/215; G01S 19/08; G01S 19/21; G01S 19/48;
(Continued)

(56) References Cited

U.S. PATENT DOCUMENTS

| 4,734,701 A | 3/1988 | Grobert |
| 5,712,641 A | 1/1998 | Casabona |

(Continued)

FOREIGN PATENT DOCUMENTS

| EP | 1035664 A1 | 9/2000 |
| EP | 2244239 B1 | 8/2013 |

(Continued)

OTHER PUBLICATIONS

K. Matsunaga, A. Senoguchi and T. Koga, "SSR Mode S downlink aircraft parameters validation and evaluation," 2013 Integrated Communications, Navigation and Surveillance Conference (ICNS), 2013, pp. 1-5, doi: 10.1109/ICNSurv.2013.6548529 (Year: 2013).*

(Continued)

*Primary Examiner* — Olumide Ajibade Akonai
(74) *Attorney, Agent, or Firm* — Thomas A. O'Rourke; Bodner + Rourke, LLP

(57) ABSTRACT

A system and method of identifying and responding to a GPS denial of service includes: configuring a mode S transponder for transmitting a GPS time-of-day message as a downlink format message using a BDS register, and configuring an aircraft surveillance system for receiving one or more GPS time-of-day messages transmitted as a downlink format message. The surveillance system compares the received time-of-day message(s) from the aircraft to a comparison time of day, and validates reception of authentic GPS signals by the aircraft when the received time-of-day message is within a threshold amount of the comparison time of day. The comparison time of day may be the GPS time of day of one of a plurality of aircraft in the surveillance volume or may be the GPS time of day determined by the aircraft surveillance system. An indicator on the transponder indicates counterfeit GPS signals, permitting mitigation od induced navigation error.

14 Claims, 14 Drawing Sheets

GPS Denial & Reporting & Mitigation Block Diagram

Related U.S. Application Data

(60) Provisional application No. 62/948,937, filed on Dec. 17, 2019, provisional application No. 62/937,815, filed on Nov. 20, 2019.

(51) Int. Cl.
*G01S 19/25* (2010.01)
*H04W 72/23* (2023.01)

(58) Field of Classification Search
CPC .......... G01S 19/42; G01S 19/14; G01S 19/51; G08G 5/0013; H04W 72/042
See application file for complete search history.

(56) References Cited

U.S. PATENT DOCUMENTS

| | | | |
|---|---|---|---|
| 5,952,968 A | 9/1999 | McDowell | |
| 6,107,960 A | 8/2000 | Krasner | |
| 6,175,327 B1 | 1/2001 | Lin | |
| 6,480,151 B2 | 11/2002 | Maalouf | |
| 6,590,528 B1 | 7/2003 | DeWulf | |
| 6,704,557 B1 | 3/2004 | Krisnamurthy | |
| 6,710,739 B1 | 3/2004 | Loegering | |
| 6,861,983 B2 | 3/2005 | Casabona | |
| 6,961,017 B1 | 11/2005 | Naylor | |
| 7,250,903 B1 | 7/2007 | McDowell | |
| 7,495,612 B2 | 2/2009 | Smith | |
| 7,508,339 B1 | 3/2009 | McDowell | |
| 7,525,482 B1 | 4/2009 | Lackey | |
| 7,583,769 B2 | 9/2009 | Twitchell | |
| 7,764,224 B1 | 7/2010 | Anderson | |
| 7,783,246 B2 | 8/2010 | Twitchell | |
| 7,880,667 B2 * | 2/2011 | Lanzkron | G01S 3/46 342/36 |
| 8,457,882 B2 | 6/2013 | Pyne | |
| 9,219,508 B1 | 12/2015 | Veysoglu | |
| 9,261,599 B1 * | 2/2016 | Golden | G01S 19/23 |
| 9,383,449 B2 | 7/2016 | Kim | |
| 9,467,236 B2 | 10/2016 | Fu | |
| 9,781,156 B2 | 10/2017 | Jover | |
| 9,781,735 B2 | 10/2017 | Comsa | |
| 9,910,160 B2 | 3/2018 | Geren | |
| 10,137,863 B2 * | 11/2018 | Johnson | H04K 3/65 |
| 10,564,289 B2 * | 2/2020 | Ries | H04K 1/00 |
| 2011/0068973 A1 | 3/2011 | Humphreys | |
| 2012/0041620 A1 * | 2/2012 | Stayton | G08G 5/0013 701/3 |
| 2014/0035783 A1 | 2/2014 | Contarino | |
| 2014/0024718 A1 | 9/2014 | Daneshmand | |
| 2015/0035702 A1 | 2/2015 | Joo | |
| 2015/0226858 A1 * | 8/2015 | Leibner | G01S 19/215 342/357.59 |
| 2016/0223677 A1 * | 8/2016 | Trevino | G01S 19/215 |
| 2017/0227650 A1 | 8/2017 | Grobert | |
| 2018/0224557 A1 | 8/2018 | Mcmilin | |
| 2021/0041890 A1 * | 2/2021 | Lu | G05D 1/0088 |

FOREIGN PATENT DOCUMENTS

| | | | | |
|---|---|---|---|---|
| EP | 2708917 A1 * | 3/2014 | ........... | G01S 19/015 |
| EP | 3026462 A1 | 6/2016 | | |
| EP | 3088911 A1 * | 11/2016 | ........... | G01S 5/0072 |
| EP | 3428688 A1 | 1/2019 | | |
| GB | 2496221 A | 5/2013 | | |
| JP | 2013250271 A | 12/2013 | | |
| WO | WO2013130818 A1 | 9/2013 | | |
| WO | WO2016034623 A1 | 3/2016 | | |

OTHER PUBLICATIONS

GPS Denied, Polaris Sensor Technologies, Inc., Nov. 18, 2019, available at: www.polarissensor.com/localization-gps-denied-environments/.

GPS Jammer Detectors | NavtechGPS, Nov. 18, 2019, available at: www.navtechgps.com/gps_jammer_detectors/.

Jeffrey Coffed et al., Detecting and Locating GPS Jamming, 2015, available at: https://orfe.princeton.edu/~alaink/SmartDrivingCars/PDFs/DetectingAndLocatingGPS_Jamming2015.pdf.

Sally Cole, Backup PNT Methods are Essential for GPS-Denied Environments, Military Embedded Systems, Nov. 15, 2019, available at: http://mil-embedded.com/articles/backup-pnt-methods-essential-gps-denied-environments/.

\* cited by examiner

Reported GPS Time of Day vs. Local Radar Time of Day

| Reported GPS Time-of-Day | Local Radar Time-of-Day |
|---|---|
| "A" 2020-10-25 02:12:15.00 | 02:12:15.02 |
| "B" 2020-10-25 02:12:16.00 | 02:12:16.01 |
| "C" 2020-10-25 02:12:18.22 | 02:12:18.23 |
| "D" 2020-10-25 02:13:18.34 | * 02:12:19.22 |
| "E" 2020-10-25 02:13:20.55 | * 02:12:21.44 |
| "F" 2020-10-25 02:13:15.89 | * 02:12:21.56 |

Green / (Light Text) = OK    Red / (Dark Text and/or Asterisked) = Ambiguity / Error

FIG. 7A

Reported GPS Position v. Measured Position

| | Reported GPS LAT/LONG | Measured Radar LAT/LONG | |
|---|---|---|---|
| A. | 42° 43' 44.00" N<br>77° 27' 38.07" W | 42° 43' 44.06" N<br>77° 27' 38.10" W | |
| B. | 40° 44' 43.20" N<br>73° 27' 18.19" W | 40° 44' 43.18" N<br>73° 27' 18.23" W | |
| C. | 39° 59' 90.22" N<br>77° 22' 56.43" W | 39° 59' 90.25" N<br>77° 22' 56.47" W | |
| D. | 41° 42' 37.00" N<br>75° 22' 40.07" W | 42° 27' 27.00" N<br>77° 34' 28.07" W | * * |
| E. | 40° 38' 22.00" N<br>75° 30' 22.07" W | 39° 43' 38.00" N<br>79° 13' 27.07" W | * * |
| F. | 43° 57' 67.00" N<br>78° 30' 44.07" W | 44° 23' 22.00" N<br>77° 35' 38.07" W | * * |

Green / (Light Text) = OK    Red / (Dark Text and/or Asterisked) = Ambiguity / Error

FIG. 7B

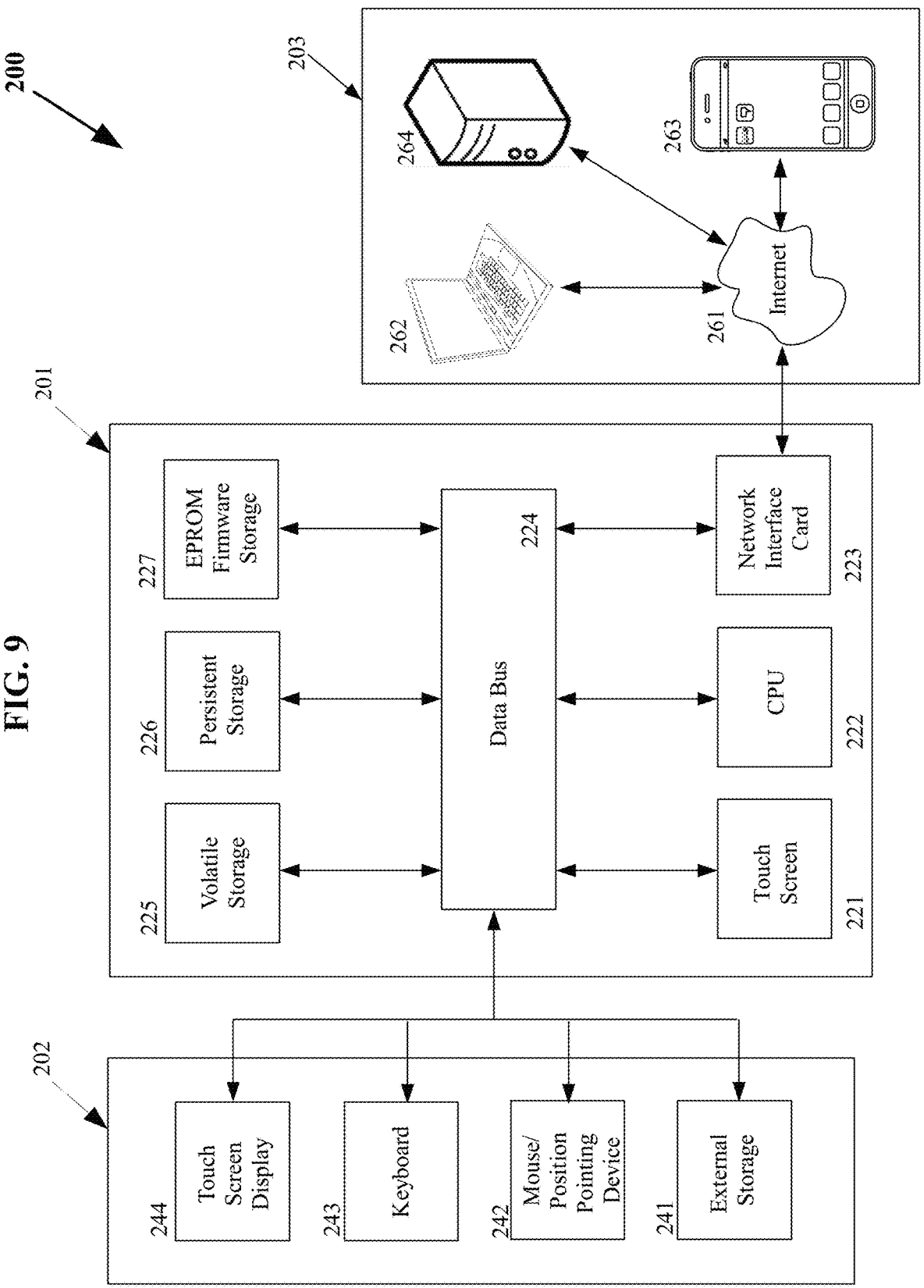

GPS DENIAL DETECTION AND REPORTING AND MITIGATION

CROSS REFERENCES TO RELATED APPLICATIONS

This application claims priority on U.S. Provisional Application Ser. No. 62/948,937, filed on Dec. 17, 2019, and is a continuation in part of U.S. application Ser. No. 17/088,768, filed on Nov. 4, 2020, which claims priority of U.S. Provisional Application Ser. No. 62/937,815, filed on Nov. 20, 2019, having the title Monopulse Secondary Surveillance Radar System, all disclosures of which are incorporated herein by reference.

FIELD OF THE INVENTION

The subject technology relates generally to denial, jamming, and/or spoofing of GPS signals, and more particularly relates to using modified wide surveillance area ATC/IFF aircraft Transponders and modified ATC SSR/MSSR/IFF ground systems to detect and report on areas within the wide area surveillance volume that has suspect GPS denial or jamming or spoofing.

BACKGROUND OF THE INVENTION

The conducting of many military operations and commercial air transport operations requires assured position, navigation, and time (PNT) data. The military, and commercial aircraft as well, rely upon a system of satellites orbiting the earth to acquire PNT data and thereby navigate. These systems are generically referred to as a Global Navigation Satellite System (GNSS), and includes the Global Positioning System (GPS), which is owned by the United States and operated by the Air Force, Europe's Galileo system, Russia's Global'naya Navigatsionnaya Sputnikovaya System (GLONASS), and China's BeiDou System.

The GPS system requires a minimum of 24 active satellites in specified orbits about the earth (i.e., four satellites in each of six orbital planes). With this satellite arrangement at least four satellites in the constellation are always visible at any given point in time to a handheld or airborne GPS receiver positioned anywhere on or above the earth's surface, to provide geo-spatial positioning with global coverage. If a receiver acquires signals from three of the four available satellites, its position may be estimated by assuming the receiver is at sea level, and if signals from a fourth satellite are also acquired, the receiver can accurately calculate its location. The GPS system provides a Standard Positioning Service (SPS), which permits receiver calculations that are generally accurate to between 5-10 meters of the actual position, and a Precise Positioning Service (PPS), which allows for removal of certain ionospheric affects and permits receiver calculations that are generally accurate to between 2-9 meters of the actual position.

Each of the GPS satellites transmit a plurality of signals, which plurality depends upon the age of the satellite, as satellites in the system are systematically retired and replaced with newer satellites that transmit additional signals. However, every GPS satellite transmits data on two microwave carrier signals—the L1 and L2 signals. The L1 carrier signal is at a frequency of 1575.42 MHz. The L2 carrier signal is at a frequency of 1227.60 MHz. An atomic clock within each satellite produces the fundamental L-band frequency of 10.23 MHz, which is multiplied by 154 and 120, respectively, to produce those L1 and L2 frequencies.

Two binary codes are superimposed upon and used to shift the L1 microwave carrier signal—a coarse acquisition (C/A) code, and a navigation message.

The C/A code is a 1 MHz pseudorandom "noise" (PRN) code that forms the basis for the civil Standard Position Services (SPS). The terms "pseudorandom" and "noise" are used with respect to the superimposed code because it is a long very complex digital pattern that to the unknowing would appear to be random noise. The C/A code repeats every 1023 bits (one millisecond), and modulates (i.e., spreads) the L1 carrier signal over a 1 MHz bandwidth. Each GPS satellite has a unique coarse acquisition PRN code, permitting identification of those satellites and the respective signals.

The navigation message is a 50 Hz signal of data bits that is also modulated onto the L1 signal. In order for a GPS receiver to calculate its position from the satellite signals, it needs at a minimum to know the time and position of the acquired satellites, particularly with respect to when the signals are transmitted. The navigation message includes three types of information:
  i) The GPS date and time, and the satellite's status;
  ii) The ephemeris: precise orbital information for the transmitting satellite; and
  iii) The almanac: status and low-resolution orbital information for every satellite.

As to the GPS date and time, that portion of the navigation message consists of time-tagged data bits marking the time of transmission of each subframe at the time they are transmitted by the satellite.

A GPS receiver receives and uses the data of the L1 microwave carrier signal, which travels at the speed of light, to calculate a pseudo-range—an estimate of the distance between the receiver and each satellite, based on how long it took for its message to arrive. The pseudo-range is a close approximation of the true range between receiver and satellite, because the transmit time and the receive time are different, which introduces clock errors that require corrections based on Einstein's general and special relativity. Once the pseudo-ranges of at least three satellites is obtained, the receiver can calculate its position through the process of trilateration, which position is represented by one of two points of intersection of the three theoretical spheres respectively centered on the satellites' positions and having radii of the corresponding pseudo-range (note the second point would be somewhere in space).

A second pseudorandom code- the Precision (P) code is modulated onto both the L1 and L2 carriers, and provides for the Precise Positioning Service (PPS), by facilitating removal of some effects of the ionosphere.

The P code may be encrypted with a W encryption code to form a Y code, which requires encryption keys to be utilized, limiting access to certain authorized users (e.g., a DoD authorized receiver). The intent of the encryption was to safe-guard the signal from interference, jamming, or spoofing, in which a hostile force recreates the signals from multiple satellites and then transmits those spoofed signals to a GPS receiver. Where a targeted GPS receiver makes use of spoofed signals, it will be tricked into calculating a location from the erroneous data that is different from its actual location. Despite efforts at encryption, disruptive technology has already been utilized to command an air vehicle to "safe-land" in hostile territory as a result of reliance on erroneous GPS data. In 2011, the nation of Iran captured a batwing stealth drone by spoofing the GPS signals that it received, tricking the drone into landing at what it believed was its home base, but was actually a location well within Iran's borders.

The threat to aircraft navigation from the spoofing of GP S signals is not limited to military aircraft. An article in GPS World dated Apr. 2, 2019—"Russia Practices Widespread Spoofing"-highlights the growing problem, citing a study that used publicly available data and commercial technologies to detect and analyze patterns of GNSS spoofing in the Russian Federation, Crimea, and Syria. The report noted that of 9,883 suspected instances of spoofing across 10 particular locations, 1,311 civilian navigation systems were affected between February 2016 and November 2018. The danger from spoofing to both military and civilian aircraft is very high, as the aircraft's GPS may be spoofed by transmission of an erroneous position that may not only lead to diversion, but also crashing of aircraft during instrument flight condition into city buildings, mountains regions, etc.

Current and advanced technology is being put in place to "harden" GPS systems against hostel attacks but does not provide detection and reporting of GPS denial of service and is not a long-time fix as noted by the constant counter measures consistently in motion. Hostile sources are now and will always continue to search for and find new ways of attacking the GPS system, and detection and reporting of this condition is paramount to GPS operation, and the genesis of this invention.

To detect and report a denial of authentic GPS signals, the present invention utilizes modified Mode S equipment. Mode S equipment consists of a surveillance radar (SSR) Mode S interrogator that transmits interrogations at a frequency of 1030 MHz, and an aircraft Mode S SSR transponder that transmits replies at a frequency of 1090 MHz.

In general, the Mode S transponder is designed to reply to ground based radar interrogations and transmits the aircraft's geo-spatial location based on satellite signals utilized by an integral GP S receiver.

More specifically, Mode S may be considered to be analogous to an airborne communication modem. The Mode S system uses two types of RF interrogations-Mode S All-Calls, and Mode S Roll-Calls. The Mode S SSR/MSSR/IFF interrogator must start the aircraft communication exchange by emitting "all-call" interrogations over a wide surveillance volume, which are addressed to all properly equipped aircraft to solicit a responses from and to initially acquire all Mode S aircraft positions and identifications. Once the Mode S aircraft in the volume are acquired by the active All-Call interrogations and each position and track is acquired, the active interrogator on subsequent antenna scans can then proceed to discretely address (i.e., "communicate with") each individual aircraft in the surveillance volume with unique Mode S interrogations—the Mode S Roll-Call, using the aircraft's globally unique 24-bit address, and which utilizes a much lower interrogation rate than is used for the All-Call interrogations. Since the discretely addressed Mode S Roll-Call interrogations are only directed at one aircraft, only that one aircraft will reply. The Mode S radar therefore permits air traffic control to track closely spaced aircraft, even one flying directly above the other. Once a particular aircraft is acquired, the Mode S radar may also send a Roll-Call lockout request to the aircraft to prevent it from responding to an all-call interrogation for a period of 18 seconds. If the Mode S transponder does not decode another lockout request within the 18 second period it will respond to All-Call interrogations again.

Under the Mode S Elementary Surveillance System (ELS) format, the Mode S transponder will transmit (i.e., "squitter") the aircraft's ID and altitude about two times per second, without being interrogated. The short squitter response Mode S format is 56 bits long, having an 8 bit control or preamble for synchronization, the 24 bit aircraft ID/address, and a 24 bit parity check.

Under the Mode S Enhanced Surveillance System (EHS), an "extended squitter" format is 112 bits long, having an 8 bit control or preamble, the 24 bit aircraft ID/address, a 56 bit message, and a 24 bit parity check. The 56 bit message is an unsolicited downlink transmission that may provide further information about the aircraft's state and intent, which are referred to as Downlink Aircraft Parameters (DAPs). The DAPs are intended to provide improved situational awareness for air traffic controllers, and permit cross-checking of navigation instructions provided to pilots and help provide early identification of a loss of separation between aircraft. The DAPs may include: magnetic heading; indicated Airspeed or Mach number; vertical rate; roll angle; track angle rate; true track angle; ground speed; and selected altitude.

To utilize the 56 bit message of the Mode S downlink transmission, the Mode S transponder stores avionics data and information in 256 different 56 bit wide Binary Data Storage (BDS) registers, which are also referred to as Comm B registers.

Devices/methods that may be related, and which are not admitted herein to be prior art to the disclosed apparatus and methods, may be shown by the following: U.S. Pat. No. 7,783,246 to Twitchell for Tactical GPS Denial and Denial Detection System; U.S. Pat. No. 5,835,059 to Nadel for "Data Link and Method"; and U.S. Pat. No. 7,123,192 to Smith for "Correlation of Flight Track Data with Other Data Sources."

It is noted that citing herein of any patents, published patent applications, and non-patent literature is not an admission as to any of those references constituting prior art with respect to the herein disclosed apparatus.

OBJECTS OF THE INVENTION

It is an object of the invention to modify conventional Mode S transponders to send a platform Time of Day (TOD) in a Mode S message, and provide apparatus that permits a SSR/MSSR/IFF receiving system to detect if GPS spoofing is occurring with respect to reported GPS aircraft position and newly provided aircraft TOD. Mode S transponders would be updated to send TOD messages by an updated ADS-B squitter message and the TOD would also made available in a selected spare BDS register so that the TOD can be extracted by an active interrogator accessing that Mode S BDS register through an uplink request. Providing TOD messages in a Squitter report and by the use of an unused BDS register provides a way for passive squitter reception systems and active Mode S interrogator systems to access the TOD from all Mode S aircraft within the surveillance volume and validate the TOD within the total surveillance volume. Any TOD anomalies within the surveillance volume would be detected by the ground equipment and reported locally, to the aircraft effected and to other end users by using added hardware display indictors and audio alarm hardware. The transponder would also be modified with hardware to display and sound a GPS denial alarm to the pilot if it were in a GPS denial area. The further use and exploitation of this readily available and already world-wide operational Mode S transponder technology over a long range wide area is the key to this invention and for detecting and reporting GPS denial areas.

It is a further object of the invention to utilize an aircraft's Mode S transponder and SSR/MSSR/IFF receiving equipment to detect if GPS spoofing is occurring where GPS spoofing includes the altering of GPS TOD or platform truth GPS position information.

It is another object of the invention to provide a system that reports a denial of GPS service to downstream end users for dissemination to the GPS users.

It is another object of the invention to provide a method of detecting if GPS jamming/spoofing is occurring to aircraft and other GPS users within the SSR/MSSR/IFF system surveillance volume.

Further objects and advantages of the invention will become apparent from the following description and claims, and from the accompanying drawings.

BRIEF DESCRIPTION OF THE DRAWINGS

The description of the various example embodiments is explained in conjunction with appended drawings, in which:

FIG. 7A shows the computer system of FIG. 5, after performing the TOD comparison and determining that three of the aircraft within the surveillance volume of FIG. 7 (i.e., aircraft "D" and "E" and "F") have each transmitted a different (erroneous) time of day message, indicating that spoofing or jamming of the GPS is occurring;

FIG. 7B shows the computer system of FIG. 5, after performing the position comparison and determining that three of the aircraft within the surveillance volume of FIG. 7 (i.e., aircraft "D" and "E" and "F") have each transmitted a different (erroneous) GPS position message, indicating that spoofing or jamming of the GPS is occurring;

FIG. 9 is a schematic illustration showing an exemplary computing unit capable of being programmed by the instructions of the software of the present invention, and which may include personal computers, cellular phones, and other mobile computing devices.

DETAILED DESCRIPTION OF THE INVENTION

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Figure 1:
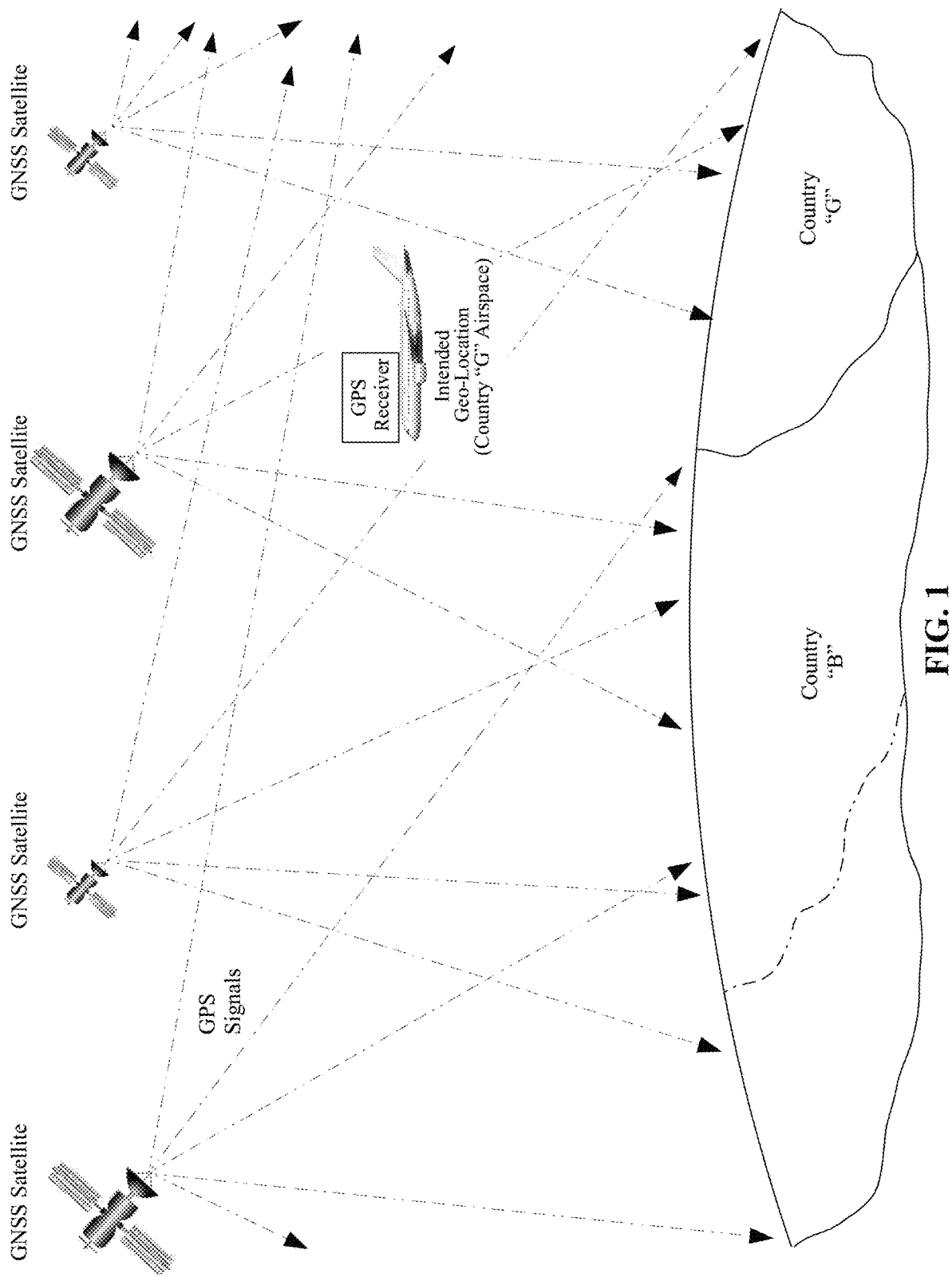
FIG. 1 illustrates multiple GNSS satellites such as GPS satellites providing GPS signals to ground-based and/or airborne receivers that utilize the data to obtain position information.
Figure 1A:
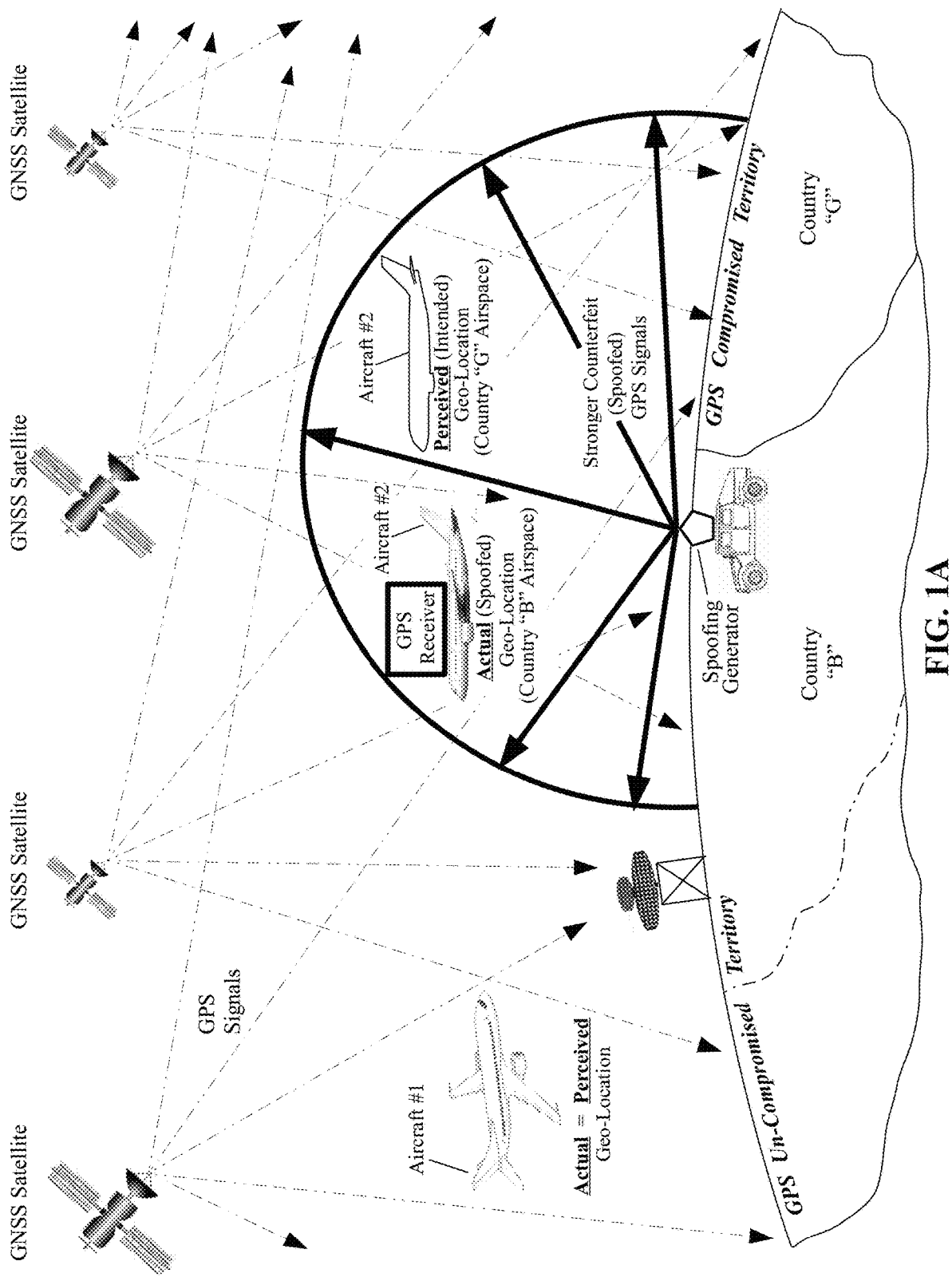
FIG. 1A illustrates multiple GNSS satellites such as GPS satellites providing GPS signals to ground-based and/or airborne receivers that utilize the data to obtain position information, and also illustrates a spoofing generator transmitting counterfeit GPS signals that deceive receivers into leading aircraft away from the intended and perceived location into a hostile (spoofed) location.

As illustrated in FIG. 1, a GNSS satellite (e.g., a satellite in the GPS constellation) transmits the required signal data permitting determination of a geo-spatial location of a GPS receiver using trilateration. However, FIG. 1A also illustrates that a spoofing generator (i.e., a satellite or more likely a ground spoofing generator) may also transmit counterfeit GPS position and/or TOD signals at a high signal strength so that they are acquired by one or more targeted GPS receivers, which counterfeit signals can be manipulated to divert an aircraft (or ground forces) from its intended location at or over a good/friendly country (country "G") to a bad/unfriendly country (country "B"), without the pilot being aware of the diversion.

Figure 2:
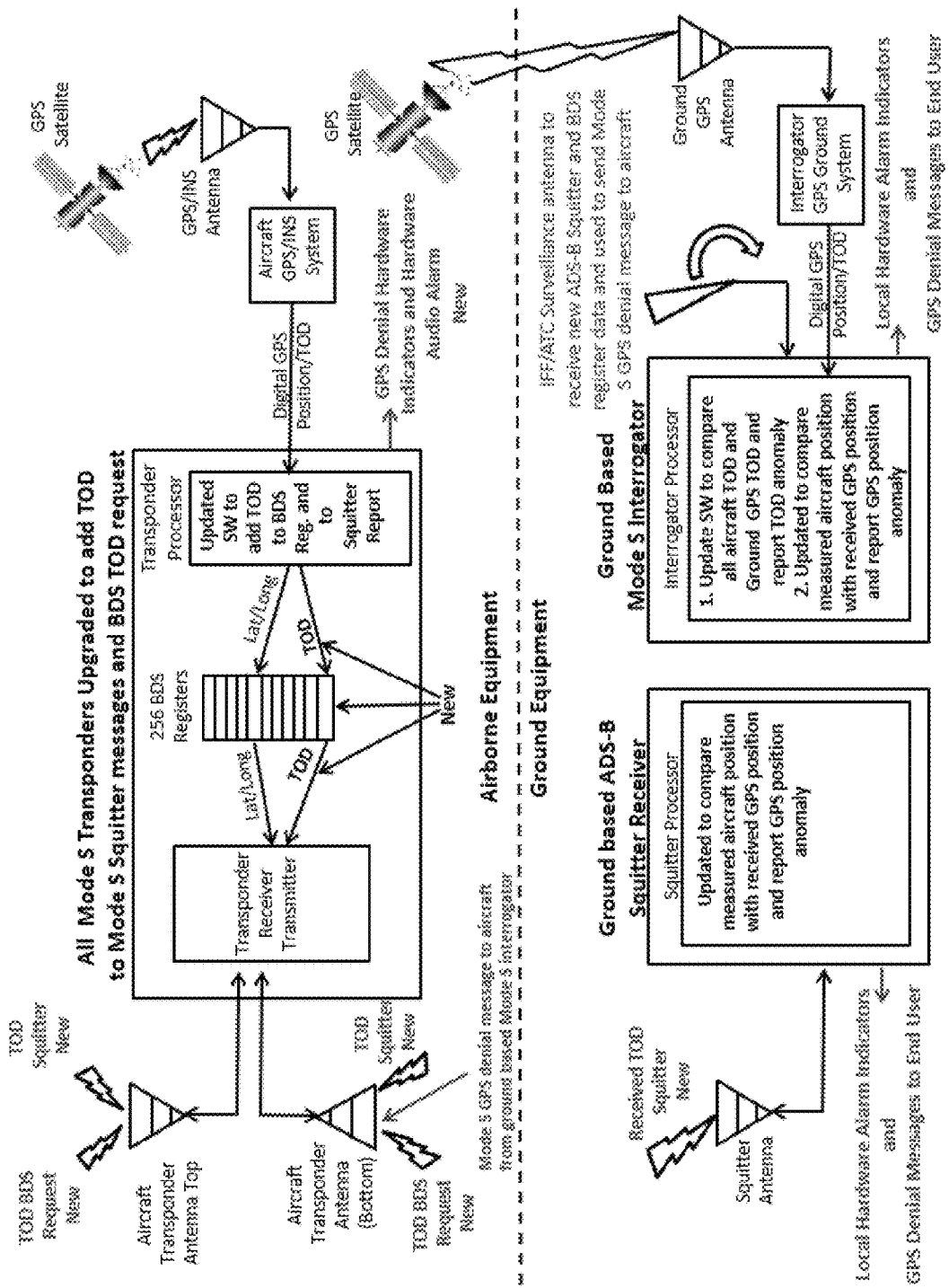
FIG. 2 is a block diagram illustrating operation of the modified radar system components in accordance with the GPS Denial Mitigation method and system disclosed herein.

To detect and report a denial of authentic GPS signals, as discussed hereinabove, Mode S equipment is modified to add a time-of-day (TOD) message, and a GPS position message, and a modified ground-based SSR/MSSR/IFF system is disclosed herein would be utilized in conjunction with those messages. A block diagram illustrating the GPS Denial Mitigation in accordance with the method and system disclosed herein is shown in FIG. 2. In particular, a modified aircraft Mode S SSR transponder 100, as shown in FIG. 3, is utilized to detect and report the effect of TOD and/or position spoofing (e.g., by notifying the pilot that the GPS signal may be counterfeit by using the "Suspicious GPS Signal Light" 101 (which may be yellow or red), the "Suspicious GPS Signal" Audible Alarm 102, and/or the GPS Message Display 103), permitting mitigation by a pilot (e.g., voice contact with air traffic control to verify the aircraft's radar position and heading, and/or reverting to alternate systems of navigation to steer on a course back toward the actual destination, including, but not limited to, pilotage, dead reckoning, etc.).

As discussed above, a conventional Mode S transponder functioning under the enhanced Surveillance system (EHS) uses the "extended squitter" format, which is 112 bits long, having an 8 bit control or preamble, a 24 bit aircraft ID/address, a 56 bit message, and a 24 bit parity check. The 56 bit message is an unsolicited downlink transmission that may provide further information. To utilize the 56 bit message of the Mode S downlink transmission, the conventional Mode S transponder may store the avionics data and information in 256 different 56 bit wide Binary Data Storage (BDS) registers, which are also referred to as Comm B registers. The following chart illustrates some often utilized BDS registers (e.g., registers 01h to 09h):

| REGISTER | CONTENT |
|---|---|
| BDS 01h | Data Link Capability Report |
| BDS 02h | Aircraft Identity |
| BDS 03h | ACAS Resolution Advisory |
| BDS 04h | Selected Vertical Intent Parameters |
| BDS 05h | Extended Squitter Airborne Position |
| BDS 06h | Extended Squitter Surface Position |
| BDS 07h | Extended Squitter Status |
| BDS 08h | Extended Squitter A/C I.D. & Category |
| BDS 09h | Extended Squitter Airborne Velocity |
| BDS__ | — |
| BDS__ | — |
| BDS__ | — |
| BDS 256 | GPS Time of Day (example only) |

Figure 3:
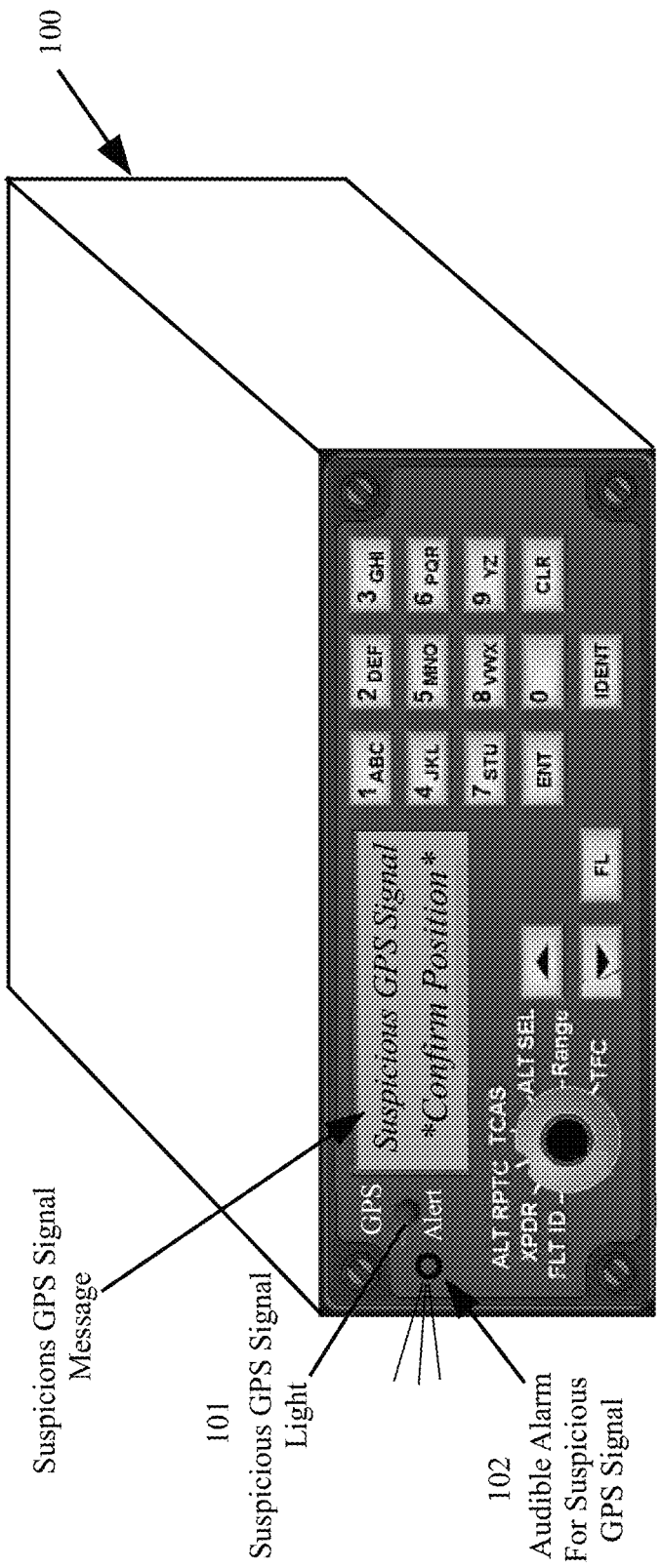
FIG. 3 illustrates one embodiment of a modified aircraft mode S SSR transponder in accordance with the system disclosed herein.

The modified aircraft Mode S SSR transponder 100 shown in FIG. 3 is particularly configured to receive and store the time of day ("TOD") derived from the received GPS signal within an unused BDS register (e.g., register: BDS 256). In addition, the aircraft Mode S SSR transponder 100 is also particularly configured to transmit the GPS derived TOD as a downlink format message to the SSR interrogator.

Figure 4:
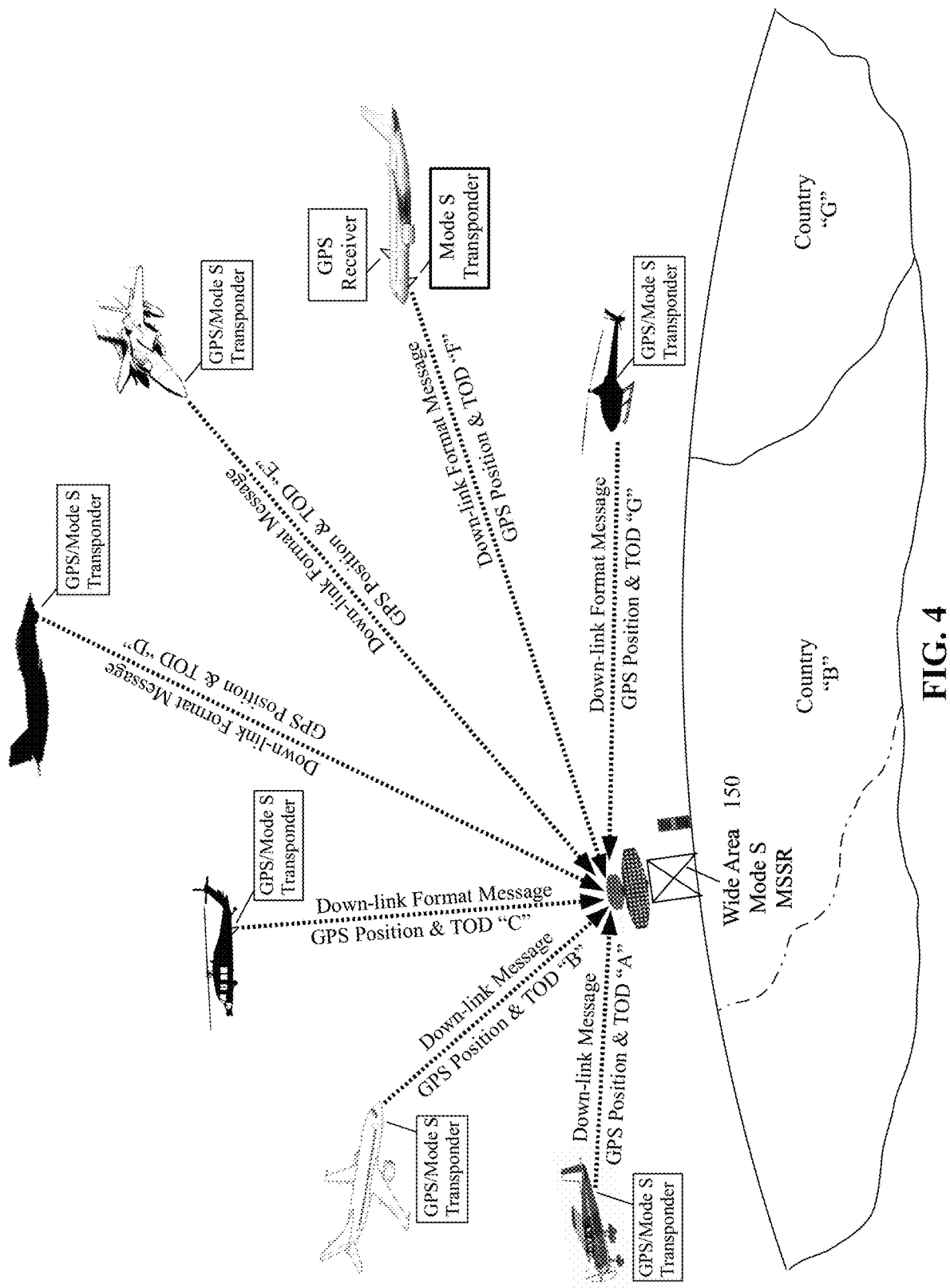
FIG. 4 illustrates utilization of the transponder of FIG. 3 by a series of aircraft for transmission of a GPS position message and time of day message stored in a BDS register of the transponder to a SSR/MSSR/IFF receiving system, for use in a method of detecting and mitigating the reception of counterfeit GPS signals.
Figure 5:
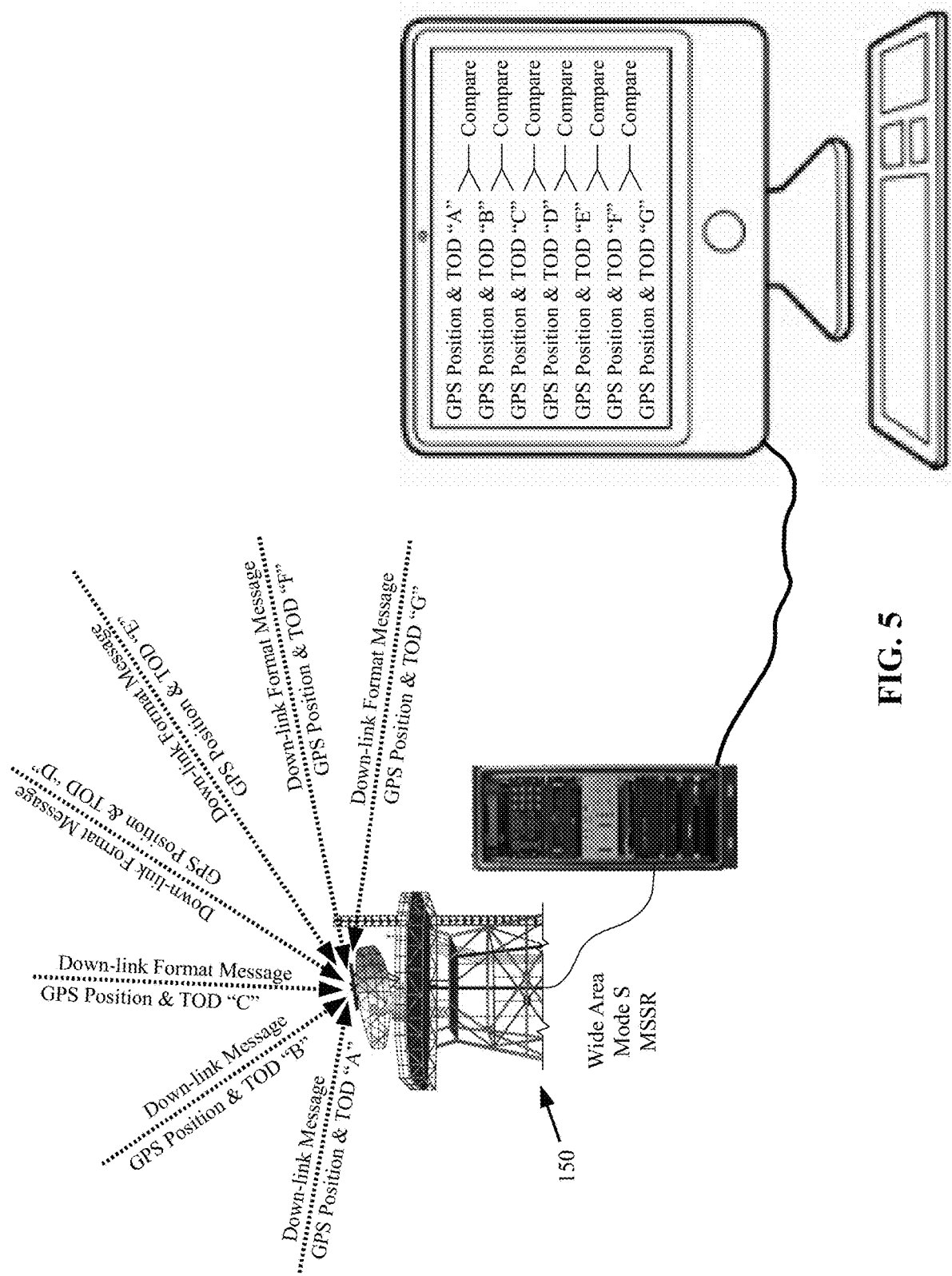
FIG. 5 illustrates the SSR/MSSR/IFF receiving system of FIG. 4, and a computer system that is used for receiving and comparing the received TOD message from all of the aircraft in the surveillance volume.

Moreover, all of the similarly equipped Mode S aircraft transponders 100 may transmit respective TOD messages to the surveillance system as a downlink format message. A wide-area Mode S monostatic secondary surveillance radar system 150 may also be configured to compare each of the received time-of-day messages, as seen in FIG. 4 and FIG. 5, as well as the GPS position messages, and may validate the GPS reception of the aircraft when the received time-of-day message and position measurements from all aircraft and the ground MSSR equipment are within a threshold amount of a comparison GPS time of day and position.

Providing TOD messages in a Squitter report through the utilization of an unused BDS register provides a means for passive squitter reception systems and active mode S interrogator system to access the TOD from all Mode S aircraft within the surveillance volume and validate each TOD within the total surveillance volume. Any TOD anomalies within the surveillance volume would be detected and reported. In particular, the reported anomaly may constitute outputting by the active mode S interrogator system of a GPS Denial Message, and transmitting the message to each of the affected aircraft using a ground-based squitter antenna, as shown in FIG. 2.

The block diagram shown in FIG. 2 provides the conditions and hardware upgrades needed by the Mode S aircraft and ground based equipment to detect and report GPS denial conditions within the ATC/IFF surveillance volume, and enables mitigation of the denial of genuine GPS signals that would otherwise impair proper aircraft navigation—both for civilian and military aircraft. For diagram simplicity only one modified transponder is shown along with one modified ground based ADS-B Squitter receiver and one modified ground based Mode S interrogator system. (Note—in one embodiment the passive ADS-B hardware is separate from the active Mode S interrogator hardware and may be spaced apart therefrom, and in another embodiment the passive ADS-B hardware is integrated into the active Mode S interrogator hardware). In actual practice, where many such aircraft include the modified equipment, the herein disclosed detection and mitigation of a GPS denial may operate more effectively, i.e., it would be much more difficult to spoof a plurality of aircraft spread across a large surveillance volume, e.g., distributed about the 125 square miles covered by a 20 mile surveillance radius of a modified MSSR, rather than if there are only two aircraft within a few miles of each other that may be spoofed by a single spoofing generator positioned nearby. It may also be more advantageous if more than one ground based system were so modified.

A principle advantage of this invention is that it may use the Mode S infrastructure already in place to detect, report and set alarm conditions for operators and pilots of GPS denial conditions.

Mode S aircraft transponders would preferably be modified with a hardware alarm and indicators and with software to provide the Time of Day (TOD) in a newly formed Mode S ADS-B Squitter message, the transponder hardware indicator would be added to display the GPS denial indication from the detecting ground system providing the visual and audio alarm to the pilot. In addition to the hardware alarm indicators, a new TOD value would have to be added to an unused and identified Mode S transponder BDS hardware register. Ground based ATC/IFF systems, which include passive Squitter receiving equipment and Mode S interrogation equipment, would be modified with software and hardware to receive and process the wide-area TOD Squitter messages and BDS TOD request messages for all updated Mode S equipped aircraft. The ground based passive Squitter receiving equipment and Mode S interrogator systems would also be modified with new firmware to compare TOD messages received from all Mode S aircraft within the total surveillance volume and ground based self GPS information to evaluate that the TOD was consistent between all entities in the system over the total surveillance volume. Since the TOD should be virtually the same for all aircraft and ground equipment within the total surveillance volume and the TOD processing delay across all entities can be made very small with known aircraft position delays removed by the ground equipment, a TOD anomaly in a given area of the surveillance volume can be detected and reported by the ground equipment including the condition where the ground equipment is itself under a GP S denial condition.

As seen from the top right of the block diagram in FIG. 2, each Mode S aircraft currently receives GPS position and GPS TOD information from the onboard GPS system or the inertial navigation system (INS). The GPS position information is currently used by the aircraft transponder to transfer aircraft position information to ground systems to self-report aircraft position. As shown by the Mode S transponder box at the top center of the block diagram, this invention would update the transponder firmware to add the TOD into the Mode S transponder reporting capability using the Mode S ADS-B Squitter and BDS infrastructure already in-place within the transponder and would require additional transponder hardware indicators and audio generation hardware to display and sound the GPS denial alarm.

The ground based Squitter receiving equipment and ground based Mode S interrogation equipment shown in the lower center of the diagram would be updated with firmware to receive and process the new TOD messages from all of the Mode S aircraft within the total surveillance volume and would evaluate if a GPS denial condition was detected anywhere within the total surveillance volume. If a GPS denial condition was detected by either a ground based Squitter receiver or ground based Mode S interrogator system, the new software within each of those systems (see ground based equipment in the two lower center boxes of FIG. 2) would provide a GPS denial condition report to the aircraft GPS denial alarm hardware via a Mode S GPS denial alarm message. In addition, the GPS denial alarm message would be sent to other end user's equipment to illuminate and sound GPS denial hardware alarm indicators. Local hardware GPS alarm indicators would be provided to indicate a GPS denial condition has been detected with the surveillance volume. GPS denial conditions can occur when the GPS signal is totally jammed, such that the GPS signals are totally lost or can occur when GPS position information or Time of Day is altered or spoofed. Detection of a GPS denial condition requires ambiguity thresholds to be setup to detect a denial condition. A lost GPS signal conditions are easily detectable by the GPS denial monitoring system when reception of surveillance platform position or time of day is lost. GPS time of day anomalies are detected when the local GPS denial monitoring system time of day and the received/reported time of day by surveillance platforms are not within the threshold limits set by a GPS denial threshold. The time of day anomaly threshold needs to be adjusted to take into consideration any additional processing time and signal propagation time from when the sending platform receives its local GPS time of day and when the GPS denial monitoring system compares that to its local time of day. That time of day anomaly threshold should be in the order of a few milliseconds but should be adjustable within the GPS denial monitoring system to take account for all possible real time delay conditions. Radio wave propagation within the earth's atmosphere is about 6.18 microseconds/nautical mile. A surveillance platform at 250 nautical miles from the GPS denial monitoring system would have a propagation delay time of about 1.45 milliseconds. If the GPS denial monitoring system detects a time difference between the received platform time and its local time that is greater than the set threshold, an anomaly alarm would be set. A reasonable time difference threshold should be in the order of <10 ms, but again this threshold would be adjustable to fine tune the time anomaly condition. A GPS position anomaly condition detectable by the GPS denial monitoring system would be set if the radar measurement position was not consistent with the reported surveillance platform GPS position. The position anomaly threshold needs to be selectable by the GPS denial monitoring system to account for the radar measurement accuracies and propagation and processing latencies. A typical measurement accuracy threshold in platform range and azimuth is 50 meters in range and 0.05 to 4 degrees in azimuth. The radar range and azimuth measurement accuracy numbers would be translated to a LAT/LONG measurement accuracy and used to select the GPS position anomaly threshold. With additional Mode S software and hardware.within the aircraft and ground systems, and in addition to reporting the GPS denial condition to other end users and end user GPS denial hardware indicators, this invention would be able to inform any aircraft and end user within the surveillance volume, that a GPS denial condition is affecting aircraft within the surveillance volume thus providing additional situational awareness to all aircraft affected. The Mode S infrastructure, which is already in place in the airborne and ground systems, can be used for this added capability with the new GPS denial software, firmware and hardware.

In addition to GPS denial of TOD conditions, the ground based Mode S interrogation equipment can also detect GPS position denial conditions. Ground based Mode S interrogator systems currently measure the position of all aircraft within the surveillance volume using its ATC/IFF radar. Mode S interrogator systems can also compare the measured range, azimuth and altitude information from each aircraft to the GPS location received from the Mode S GPS provided position data to determine if a GPS position denial condition exists. Using the new GPS denial software added to the ground Mode S interrogator system to detect errors in received GPS position as compared to the radar measured position; the new software and alarm hardware within the ground based Mode S interrogator system would provide a GPS denial condition report to the aircraft pilots and other end users using their GPS denial display and audio hardware indicators.

Figure 6:
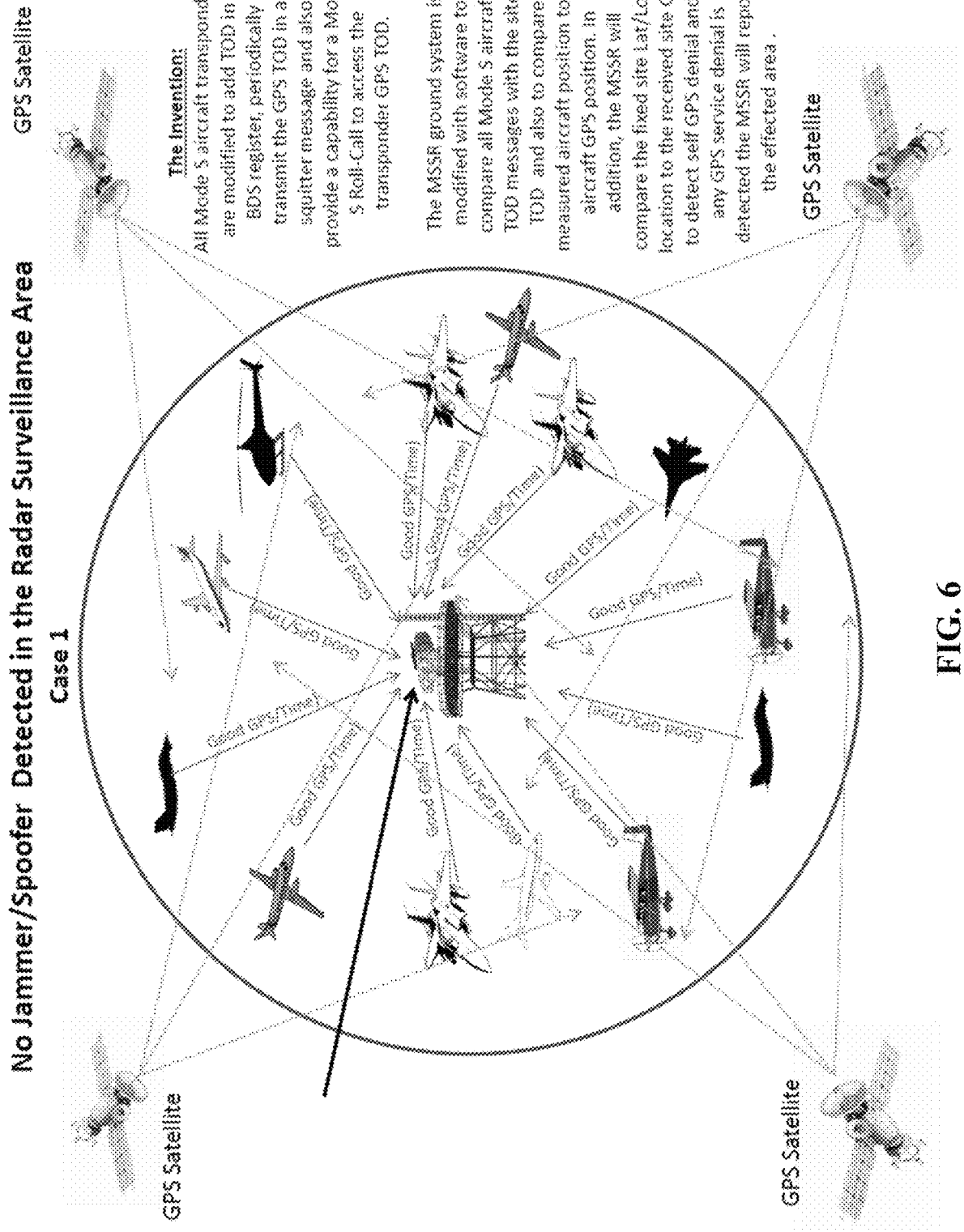
FIG. 6 (Case 1) illustrates a plurality of GNSS satellites such as a GPS satellite providing GPS signals to ground-based SSR/MSSR/IFF system and to airborne receivers that utilize the data for obtaining GPS position and time information, and also illustrates a normal non-GPS jamming/spoofing environment, where in the absence of GPS interference, all Mode S equipped aircraft in the environment determine their proper position and the actual time from the GPS satellite signals, and transmit those respective times/positions to the SSR/MSSR/IFF system via ADS-B messages or by active SSR/MSSR/IFF system requests for aircraft position via the new Mode S time-of-day message.
Figure 6A:
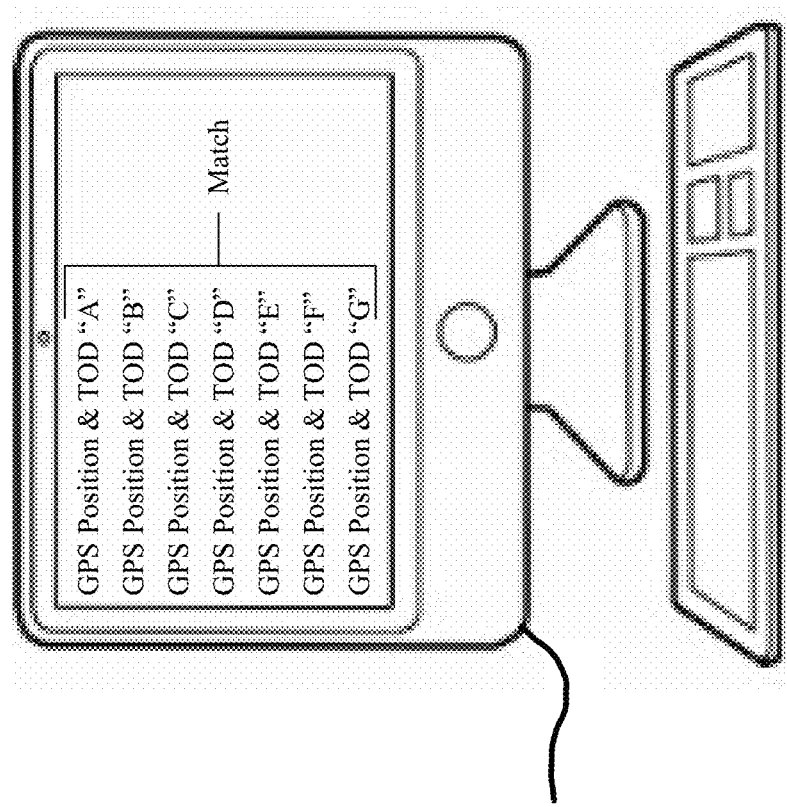
FIG. 6A shows the computer system of FIG. 5, after performing the comparisons and determining that each of the aircraft within the surveillance volume illustrated in FIG. 6 have transmitted the same time of day message, and transmitted GPS locations that match the radar positions, indicating that spoofing or jamming of the GPS is not occurring therein.

FIG. 6 (Case 1) illustrates where GNSS satellites provide GPS signals to ground-based SSR/MSSR/IFF system and to airborne receivers that utilize the data for obtaining GPS position and time information, and also illustrates a normal non-GPS jamming/spoofing environment. In the absence of GPS interference, all Mode S equipped aircraft in the environment determine their position and time from the GPS satellite signals. Aircraft GPS positions are reported to the SSR/MSSR/IFF system via ADS-B messages or by active SSR/MSSR/IFF system requests for aircraft position. Aircraft time synchronization data is reported to the SSR/MSSR/IFF system via the new Mode S time-of-day message. The computer system of the SSR/MSSR/IFF system, using its updated GPS denial detection hardware and software compares the aircraft GPS reported positions to the aircraft positions measured by the MSSR, and compares the time-of-day reports from other aircraft in the surveillance volume to its own time source to determine that there is no interference in the GPS signals received by the aircraft in the environment or the SSR/MSSR/IFF system.

Figure 7:
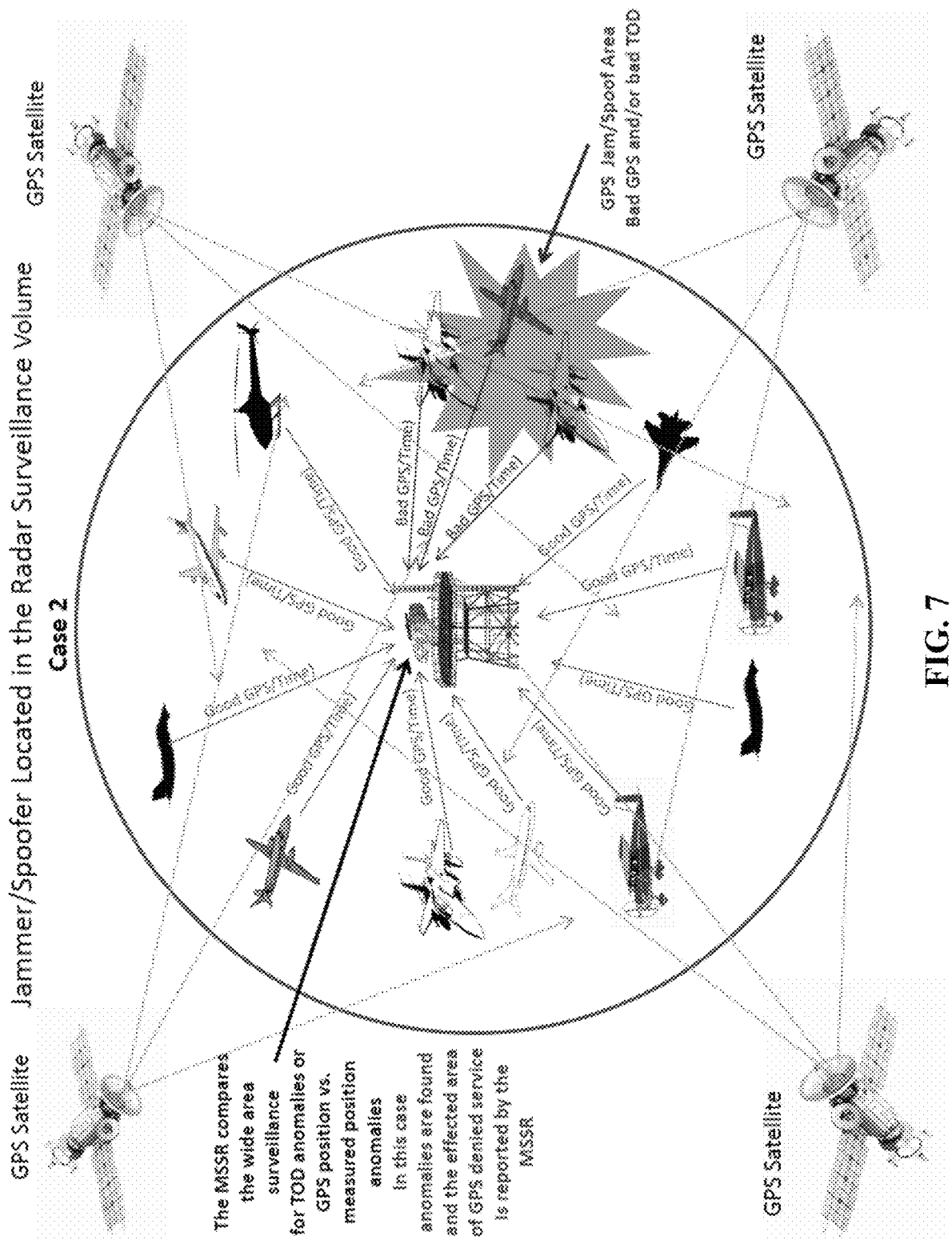
FIG. 7 (Case 2) illustrates an area within a large radar surveillance volume that is affected by a GPS jammer/spoofer, within which affected area the Mode S aircraft may lose GPS altogether, may be spoofed to send erroneous GPS position information to the SSR/MSSR/IFF system in accordance with the present invention, and/or may be affected by GPS TOD interference.

FIG. 7 (Case 2) illustrates an area within the larger radar surveillance volume that is affected by a GPS jammer/spoofer. Mode S aircraft in that area may lose GPS altogether, may be spoofed to send erroneous GPS position information or may be affected by GPS TOD interference. The SSR/MSSR/IFF system receives reported aircraft position and time synchronization data via new time-of-day messages. In comparing the reported position and measured position data, or comparing the time synchronization data from other aircraft within the surveillance volume with the SSR/MSSR/IFF system's own time-of-day, the computer system of the SSR/MSSR/IFF system is able to identify and report a remote region of its coverage volume which is experiencing GPS interference. For example, FIG. 7A shows the computer system of FIG. 5, after performing the TOD comparison for the aircraft shown in the surveillance volume of FIG. 7, and has determined that three of the aircraft within the surveillance volume of FIG. 7 (i.e., aircraft "D," aircraft "E," and aircraft "F") have transmitted a different (erroneous) time of day message, indicating that spoofing or jamming of the GPS is occurring. (Note that one aircraft may be used as a baseline for the time comparison with all the other aircraft, or alternatively the time determined by the MSSR may be used as the baseline to determine the deviation of each aircraft or of the MSSR itself). In addition, FIG. 7B shows the computer system of FIG. 5, after comparing the GPS position transmitted by each aircraft with the positioned determined by the radar, and has determined that three of the aircraft within the surveillance volume of FIG. 7 have transmitted a different (erroneous) GPS position message, confirming that spoofing or jamming of the GPS is occurring.

Figure 8:
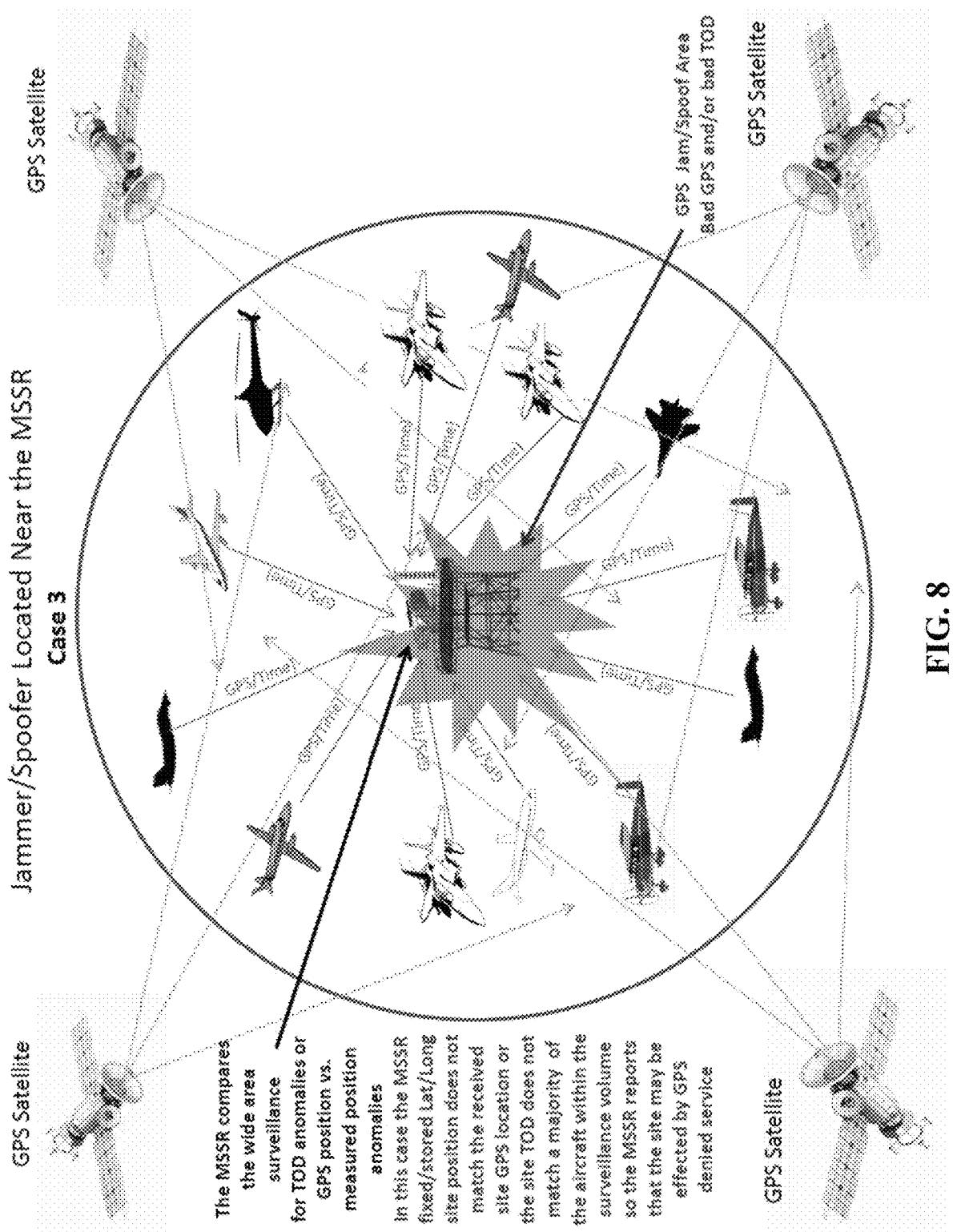
FIG. 8 (Case 3) illustrates an area near the SSR/MSSR/IFF ground equipment that is affected by a GPS jammer/spoofer.
Figure 8A:
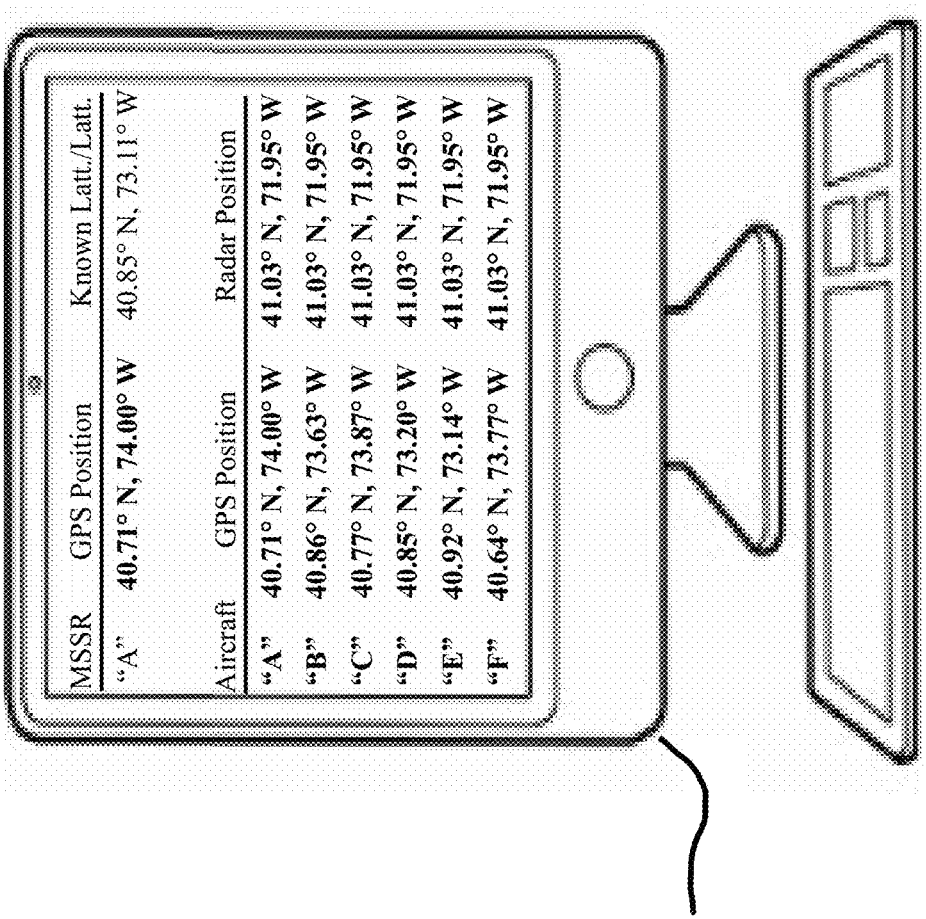
FIG. 8A shows the computer system of FIG. 5, after performing the TOD comparison and determining that all of the aircraft within the surveillance volume of FIG. 8 have transmitted the same time of day message, indicating that spoofing or jamming of the GPS is not occurring.
Figure 8B:
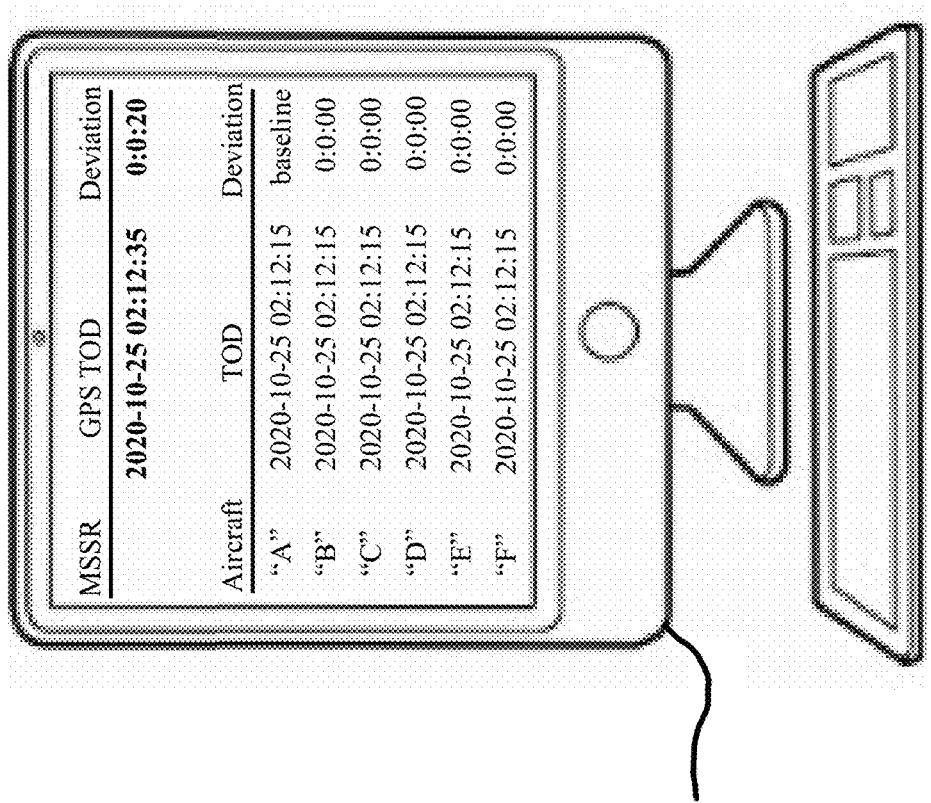
FIG. 8B shows the computer system of FIG. 5, after performing the position comparison for the MSSR itself, and determining that position of the MSSR within the surveillance volume of FIG. 8 based on the received GPS signals does not match its proper longitude and latitude position, indicating that spoofing or jamming of the GPS at the MSSR location is occurring.

FIG. 8 (Case 3) illustrates an area near the SSR/MSSR/IFF ground equipment that is affected by a GPS jammer/spoofer. Many Mode S aircraft over the larger area of surveillance would typically not be affected by this condition because of the limited range of GPS jamming equipment. In this case, the SSR/MSSR/IFF system radar site may lose GPS altogether, may be spoofed with erroneous GPS position information or may be affected by GPS TOD interference. This condition is also detectable by the ground SSR/MSSR/IFF system by comparing the received GPS location with its fixed stored Latitude/Longitude (see FIG. 8B, which shows a difference between the MSSR's actual/known location and its location as determined by the received/spoofed GPS signals). In addition, the ground SSR/MSSR/IFF equipment is able to detect a GPS TOD error because it is constantly comparing GPS received TOD at the ground site with all aircraft transmitting Mode S TOD over a much larger surveillance area. Counterfeit GPS signals are detectable, through the transmission of a GPS time of day message store in a BDS register of the transponder; and from the comparison of measured position and received GPS position by the ground SSR/MSSR/IFF computer system. The SSR/MSSR/IFF system receives reported aircraft position and time synchronization data over a large Surveillance volume via existing and new time-of-day messages. In comparing the time synchronization data from aircraft within the surveillance volume and the SSR/MSSR/IFF system's own time-of-day, the computer system of the SSR/MSSR/IFF is able to identify that time synchronization is consistent across the entire coverage volume, but not aligned to the SSR/MSSR/IFF system's own time-of-day (see FIG. 8A). In addition, the SSR/MSSR/IFF system continuously monitors its local GPS position, while comparing it to its stored fix position to also identify that the SSR/MSSR/IFF system location is experiencing GPS interference. In either of these situations, the computer system of the SSR/MSSR/IFF system is able to identify and report that the local GPS time source or GPS position at the MSSR location is experiencing GPS interference.

Software/firmware of the present invention may run on a suitable computing device, such as a server, a tablet, a cell phone, or other mobile smart device, so a description of such an accessorized exemplary computer system is hereinafter disclosed, even though a particular embodiment may not require all of the described components. Exemplary computer system 200 (i.e., a client device associated with a particular user) is shown schematically in FIG. 9, and which may include computing unit 201 interacting with external peripherals 202, such as a separate touch screen display 244, and interacting with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static non-transitory storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of non-transitory computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A method of identifying and responding to a global positioning system (GPS) denial of service, said method comprising the steps of:
   equipping an aircraft with a mode S airborne transponder;
   configuring the aircraft's mode S transponder for transmitting a GPS-derived time-of-day as a message;
   transmitting the aircraft's time-of-day message as a downlink format message using an available binary data storage (BDS) register;
   configuring an aircraft surveillance system for receiving a GPS time-of-day message transmitted as a downlink format message;
   receiving, by the aircraft surveillance system, the time-of-day message from the aircraft;
   configuring the aircraft surveillance system for comparing the received time-of-day message from the aircraft to a comparison time of day;
   validating reception of authentic GPS signals by the aircraft when the received time-of-day message is within a threshold amount of the comparison time of day;
   indicating when the received time-of-day message is beyond the threshold amount of the comparison time of day; and
   mitigating erroneous aircraft navigation when the received time-of-day message is beyond the threshold amount of the comparison time of day.

2. The method according to claim 1, further comprising using a GPS time of day determined by the aircraft surveillance system as the comparison time of day.

3. The method according to claim 1, further comprising:
   transmitting a GPS position of the aircraft to the aircraft surveillance system;
   comparing the transmitted GPS position of the aircraft to a radar-determined position of the aircraft;
   confirming reception of authentic GPS signals by the aircraft when the transmitted GPS position of the aircraft is within a threshold distance of the radar-determined position of the aircraft; and
   mitigating erroneous aircraft navigation based on the GPS denial of service when the transmitted GPS position of the aircraft is beyond the threshold distance.

4. The method according to claim 1, further comprising:
   equipping each of a plurality of additional aircraft with a mode S transponder configured for transmitting a respective GPS time-of-day message;
   transmitting a respective time-of-day message by each of the additional aircraft from the respective mode S transponder as a downlink format message using an available BDS register;
   receiving by the aircraft surveillance system the respective time of day messages from the plurality of additional aircraft;
   using one of the received time of day messages from one of the aircraft as the comparison time of day;

indicating when one or more of the received respective time-of-day messages from the plurality of additional aircraft is beyond the threshold amount from the comparison time of day; and mitigating erroneous aircraft navigation when the one or more received respective time-of-day messages from the plurality of additional aircraft is beyond the threshold amount of the comparison time of day.

5. The method according to claim 4, further comprising:

transmitting a respective GPS position by each of the plurality of additional aircraft to the aircraft surveillance system;

comparing the transmitted GPS position of each of the plurality of additional aircraft to a radar determined position of each of the plurality of additional aircraft;

confirming reception of authentic GPS signals by each of the plurality of additional aircraft when the transmitted GPS position of each of the plurality of additional aircraft is within a threshold distance of the radar determined position of the aircraft; and mitigating erroneous aircraft navigation when the transmitted GPS position of one of the plurality of additional aircraft is beyond the threshold distance.

6. The method according to claim 1, further comprising:

comparing a GPS determined location of the aircraft surveillance system with its known latitude and longitude;

validating the GPS service for each the aircraft surveillance system when the GPS determined location of the aircraft surveillance is within a threshold distance of its known latitude and longitude; and mitigating erroneous aircraft navigation when the GPS determined location of the aircraft surveillance is beyond the threshold distance from its known latitude and longitude.

7. A system configured to identify and mitigate a denial of authentic global positioning system (GPS) signals to one or more aircraft, said system comprising:

a mode S transponder on a first aircraft, said mode S transponder configured to transmit a GPS-derived time-of-day message as a downlink format message;

an aircraft surveillance system, said aircraft surveillance system configured to receive the GPS-derived time-of-day message transmitted as a downlink format message from said mode S transponder of the first aircraft;

wherein said aircraft surveillance system is further configured to compare the received time-of-day message from said mode S transponder of the first aircraft to a comparison time of day;

wherein said aircraft surveillance system is further configured to validate the GPS reception of the mode S transponder on the first aircraft when the received time-of-day message from the first aircraft is within a threshold amount of said comparison time of day; and a hardware indicator, said hardware indicator configured to indicate when the received time-of-day message from the first aircraft is greater than said threshold amount from said comparison time of day to permit mitigation of erroneous aircraft navigation based on the denial of authentic GPS signals.

8. The system according to claim 7, wherein said aircraft surveillance system is configured to determine a time of day from received GPS signals; and wherein said aircraft surveillance system is further configured to use said GPS time of day determined by the aircraft surveillance system as said comparison time of day.

9. The system according to claim 7, wherein said mode S transponder on the first aircraft is configured to transmit a GPS position of the first aircraft to said aircraft surveillance system;

wherein said aircraft surveillance system is configured to determine a radar position of the first aircraft;

wherein said aircraft surveillance system is further configured to compare said transmitted GPS position of the first aircraft to said radar-determined position of the first aircraft;

wherein said aircraft surveillance system is configured to confirm reception of authentic GPS signals when the transmitted GPS position of the aircraft is within a threshold distance of the radar-determined position of the aircraft.

10. The system according to claim 7, further comprising a mode S transponder on each of one or more additional aircraft, each said mode S transponder on the one or more additional aircraft configured to transmit a respective GPS-derived time-of-day message as a downlink format message;

wherein said aircraft surveillance system is further configured to compare the received time-of-day message from said mode S transponder of the first aircraft to each of the received respective time of day messages from the mode S transponders on the one or more additional aircraft; and wherein said aircraft surveillance system is further configured to use said GPS time of day from any one of said mode S transponders as said comparison time of day.

11. The system according to claim 10, wherein each said mode S transponder on each of the one or more additional aircraft is configured to transmits a GPS position of the respective aircraft to said aircraft surveillance system;

wherein said aircraft surveillance system is configured to compare each said transmitted GP S position to a radar-determined position of each of the one or more additional aircraft; and wherein said hardware indicator is further configured to indicate when the transmitted GPS position of each of the one or more additional aircraft is beyond a threshold distance of said radar-determined position.

12. The system according to claim 7, wherein said aircraft surveillance system is configured to compare a GPS determined location of said aircraft surveillance system with the known latitude and longitude of said aircraft surveillance system; and wherein said hardware indicator is further configured to indicate when said GPS determined location of said aircraft surveillance system is beyond a threshold distance from the known latitude and longitude of said aircraft surveillance system.

13. The system according to claim 7, wherein said hardware indicator comprises an audio generator, said audio generator configured to emit an alarm sound when the received time-of-day message from the first aircraft is greater than said threshold amount from said comparison time of day.

14. The system according to claim 7, wherein said hardware indicator comprises a display screen on each said mode S transponder, said display screen configured to display a textual warning when the received time-of-day message from the first aircraft is greater than said threshold amount from said comparison GPS time of day.

\* \* \* \* \*